3,137,733
PREPARATION OF SOLID REACTION PRODUCTS OF DECABORANE AND AN ACETYLENIC HYDROCARBON
John W. Ager, Jr., Buffalo, N.Y., assignor to Olin Mathieson Chemical Corporation, a corporation of Virginia
No Drawing. Filed Jan. 13, 1959, Ser. No. 786,656
4 Claims. (Cl. 260—606.5)

This invention relates to solid reaction products of acetylenic hydrocarbons and decaborane.

The solid products of this invention, when incorporated with suitable oxidizers such as ammonium perchlorate, potassium perchlorate, sodium perchlorate, etc., yield solid propellants generally suitable for rocket power plants and other jet propelled devices. Such propellants burn with high flame speeds, have high heats of combustion, and are of the high specific impulse type. The solid products of this invention, when incorporated with oxidizers, are capable of being formed into a wide variety of grains, tablets and shapes, all with desirable chemical and mechanical characteristics. Propellants produced produced by the methods described in this application burn uniformly without disintegration when ignited by conventional means, such as pyrotechnic type igniters, and are also mechanically strong enough to withstand ordinary handling.

Decaborane is a white crystalline solid having a melting point of 99.5° C. and a boiling point of 213° C. It may be prepared by the pyrolysis of diborane according to procedures well known in the art.

The solid reaction products of this invention are prepared by reacting decaborane with an acetylenic hydrocarbon having from 2 to 5 carbon atoms in the presence of an alkali metal hydride. The ratio of reactants can be varied widely, generally being in the range of from 0.1 to 10 moles of acetylenic hydrocarbon per mole of decaborane and preferably in the range of from 1 to 5 moles of acetylenic hydrocarbon per mole of decaborane. The amount of alkali metal hydride employed also can be varied widely, generally being in the range of from 0.01 to 10 moles of alkali metal hydride per mole of decaborane and preferably in the range of 0.1 to 1 mole of alkali metal hydride per mole of decaborane. The reaction temperature can vary from 100° to 350° C. and preferably from 150° to 200° C., while the pressure can vary from 2 to 20 atmospheres. The reaction generally requires about 1 to 10 hours depending upon the ratio of reactants and the temperature and pressure employed.

Suitable acetylenic hydrocarbons include acetylene, methylacetylene, 1-butyne, 1-pentyne, and the like.

Although the reaction will proceed in the absence of a solvent, a solvent common for the reactants but inert with respect to the reactants under the reaction conditions is usually employed. Such solvents include aliphatic hydrocarbon solvents such as n-pentane, hexane and heptane, aromatic hydrocarbon solvents such as benzene, toluene and xylene, cycloaliphatic solvents such as cyclopentane and methylcyclohexane, and oxygenated solvents such as diethylether and diisopropylether. The amount of solvent can vary widely, but is generally within the range of about 1 to 100 moles of solvent per mole of acetylenic hydrocarbon.

The process of this invention is illustrated in detail by the following examples which are to be considered not limitative.

*Example I*

A solution of 6 grams (0.05 mole) of decaborane and 0.1 gram (0.004 mole) of sodium hydride in 50 ml. of diethyl ether was placed in a 100 ml. autoclave. Methylacetylene was added under pressure to about 80 p.s.i.g. and the mixture was heated at 175° C. for 1½ hours with stirring. The maximum pressure was about 350 p.s.i.g. The autoclave was cooled to room temperature, opened, and the contents transferred to a flask. The ether was evaporated and the remaining liquid product was heated at 90° C. to remove unreacted decaborane by sublimation. The residue after sublimation of the decaborane was 3 grams of a glossy brown solid containing 40 percent boron.

*Example II*

A solution of 2 grams (0.017 mole) of decaborane and 0.1 gram (0.005 mole) of sodium hydride in 75 ml. of diethyl ether was placed in an autoclave and acetylene was added under pressure to about 100 p.s.i.g. The mixture was heated with stirring at 160° C. for 1½ hours. The maximum pressure was about 350 p.s.i.g. The autoclave was cooled to room temperature, opened, and the contents transferred to a flask. The ether was distilled to give a solid product which contained, according to mass spectrographic analysis, a monomer with a molecular weight of 146.

The function of the alkali metal hydride in the reaction is not definitely known. It is known, however, that sodium hydride and decaborane react vigorously in diethyl ether under normal conditions of temperature and pressure to produce decaboranyl sodium $NaB_{10}H_{13}$. Hence in the above examples, decaboranyl sodium may promote the reaction of the acetylene and the decaborane.

The boron-containing solid materials produced by the method of this invention can be employed as an ingredient of solid propellant compositions in accordance with general procedures which are well-understood in the art, inasmuch as they are readily oxidized using conventional solid oxidizers, such as ammonium perchlorate, potassium perchlorate, sodium perchlorate, lithium perchlorate, aluminum perchlorate, ammonium nitrate and the like. In formulating a solid propellant composition employing a solid material produced in accordance with the present invention, generally from 10 to 35 parts by weight of the solid material and from 65 to 90 parts by weight of oxidizer, such as ammonium perchlorate, are present in the final propellant composition. In the propellant, the oxidizer and the solid material of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable organoboron solid material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided boron-containing material can be admixed with a high solids content solution of a partially condensed urea-formaldehyde or phenol-formaldehyde resin, the proportions being such that the amount of the resin is about 5 to 10 percent by weight, based upon the weight of the oxidizer and boron compound. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

I claim:

1. A method for the preparation of solid reaction products of decaborane and an acetylenic hydrocarbon which comprises reacting decaborane with an acetylenic hydrocarbon having from 2 to 5 carbon atoms at a temperature of from 100 to 350° C. and a pressure of about 2 to 20 atmospheres while the decaborane is in admixture with an alkali metal hydride.

2. A method for the preparation of solid reaction products of decaborane and an acetylenic hydrocarbon which comprises reacting decaborane with an acetylenic hydrocarbon having from 2 to 5 carbon atoms in a ratio of from 0.1 to 10 moles of acetylenic hydrocarbon per mole of decaborane while the decaborane is in admixture with from 0.01 to 10 moles of sodium hydride per mole of decaborane in the presence of a solvent inert with respect to the reactants under the reaction conditions at a temperature of from 100 to 350° C. and a pressure of about 2 to 20 atmospheres.

3. The process of claim 2 wherein the acetylenic hydrocarbon is methylacetylene and the solvent is diethyl ether.

4. The process of claim 2 wherein the acetylenic hydrocarbon is acetylene and the solvent is diethyl ether.

No references cited.